US012655038B2

(12) United States Patent
Koppert et al.

(10) Patent No.: US 12,655,038 B2
(45) Date of Patent: Jun. 16, 2026

(54) METHOD FOR OPTICAL ACTIVATION OF THE SENSOR SURFACE, IN PARTICULAR FOR ZERO CHLORINE SENSORS

(71) Applicant: ProMinent GmbH, Heidelberg (DE)

(72) Inventors: Klaus Koppert, Mannheim (DE); Johannes Hartfiel, Ludwigshafen (DE); Holger Schopf, Heilbronn (DE)

(73) Assignee: PROMINENT GMBH, Heidelberg (DE)

( * ) Notice: Subject to any disclaimer, the term of this patent is extended or adjusted under 35 U.S.C. 154(b) by 737 days.

(21) Appl. No.: 17/844,110

(22) Filed: Jun. 20, 2022

(65) Prior Publication Data

US 2023/0002252 A1 Jan. 5, 2023

(30) Foreign Application Priority Data

Jun. 22, 2021 (DE) ..................... 10 2021 116 153.3

(51) Int. Cl.

*C02F 1/30* (2023.01)
*G01N 27/333* (2006.01)
*G01N 27/404* (2006.01)

(52) U.S. Cl.

CPC ............. *C02F 1/30* (2013.01); *G01N 27/333* (2013.01); *G01N 27/404* (2013.01); *C02F 2209/29* (2013.01)

(58) Field of Classification Search

CPC ..... C02F 1/30; C02F 2209/29; G01N 27/333; G01N 27/404; G01N 27/40; G01N 27/38; G01N 27/26; G01N 27/30; G01N 27/403; C25F 1/00

See application file for complete search history.

(56) References Cited

U.S. PATENT DOCUMENTS 11,215,579 B2 1/2022 Koppert et al.
2002/0103409 A1* 8/2002 Kuriyama ............... C02F 1/325 588/306
2012/0103823 A1* 5/2012 Dweik ................ C02F 1/46109 205/780
2012/0132543 A1* 5/2012 Suzuki ............... G01N 33/5438 205/780.5

(Continued)

FOREIGN PATENT DOCUMENTS

CH 672845 A5 12/1989
DE 4211198 A1 10/1993

(Continued)

OTHER PUBLICATIONS

Xu et al., Dynamical properties of iodine release in potassium iodide solution under combination of ultrasound and light irradiations, Ultrasonics Sonochemistry, 2009, 16, 475-480 (Year: 2009).*

(Continued)

*Primary Examiner* — Shizhi Qian

(74) *Attorney, Agent, or Firm* — PAUL & PAUL

(57) ABSTRACT

An electrochemical sensor of a measuring device is cleaned and conditioned to optically activate the surface of the sensor. The conditioning agent is produced by irradiating an electrolyte with a physical-technological radiation source inside a measurement chamber including both working and reference electrodes.

18 Claims, 2 Drawing Sheets

(56) References Cited

U.S. PATENT DOCUMENTS

Figure 1:
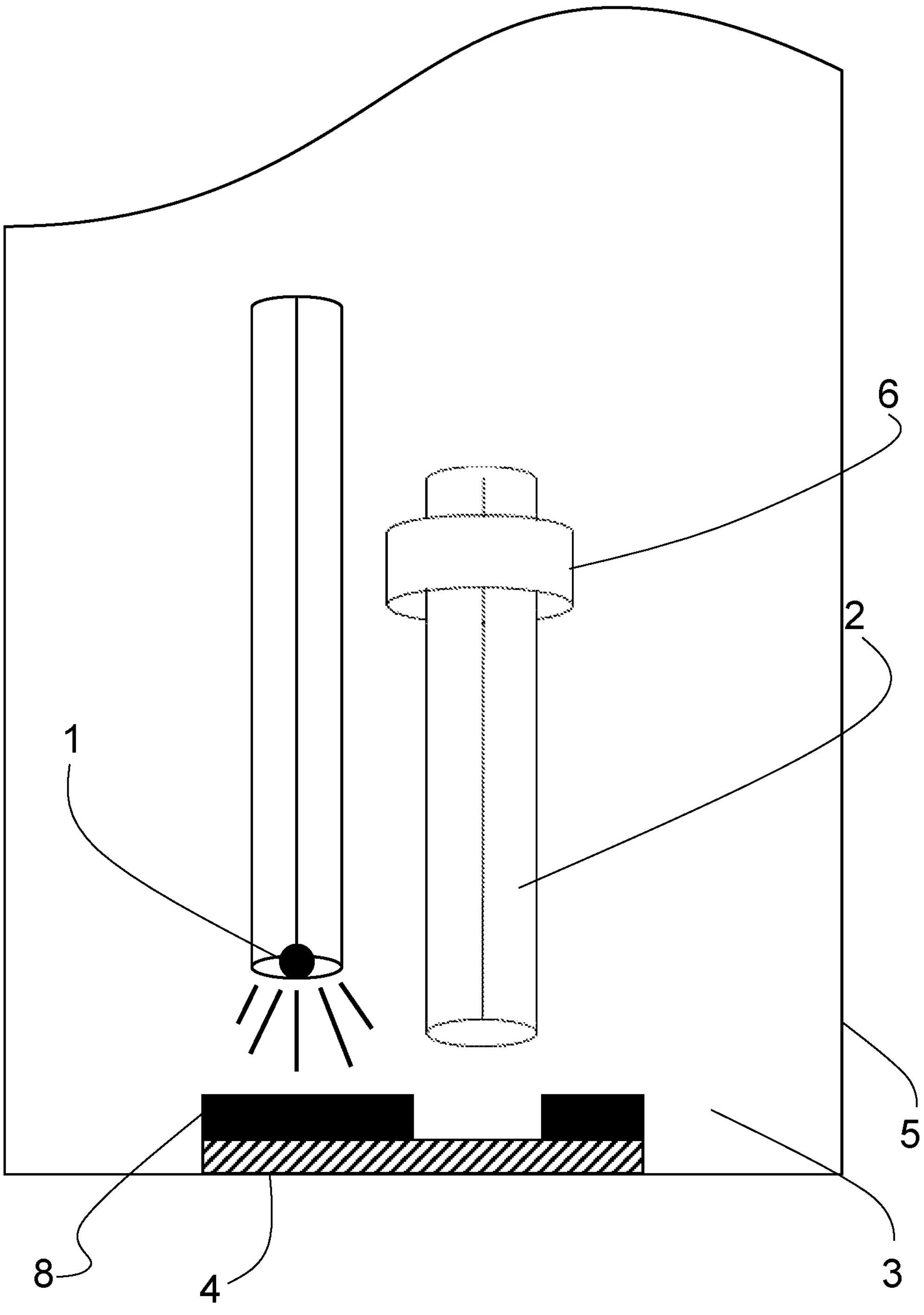

| | | | | |
|---|---|---|---|---|
| 2013/0059396 | A1* | 3/2013 | LeBoeuf | G01N 27/414<br>204/407 |
| 2017/0089860 | A1* | 3/2017 | Konno | G01N 27/4168 |
| 2019/0376923 | A1* | 12/2019 | Koppert | G01N 27/4045 |
| 2024/0125727 | A1* | 4/2024 | Kjaer | G01N 27/333 |

FOREIGN PATENT DOCUMENTS

| | | | |
|---|---|---|---|
| DE | 10309022 | A1 | 9/2004 |
| DE | 102018113430 | A1 | 12/2018 |
| DE | 102018004450 | A1 | 12/2019 |
| DE | 102018113640 | A1 | 12/2019 |
| EP | 1452858 | B1 | 9/2004 |
| JP | 2020034408 | A * | 3/2020 |
| KR | 102183652 | B1 | 11/2020 |
| WO | 2015112671 | A1 | 7/2015 |

OTHER PUBLICATIONS

Huang et al., Potassium iodide potentiates broad-spectrum antimicrobial photodynamic inactivation using photofrin, ACS infect Dis, 2017, 3(4), 320-328 (Year: 2017).*

Water Journal, [Ausgezeichneter Fall], Jun. 2, 2021, ATT Co., Ltd. J-Tech Co., Ltd. Coating Korea.

EVOQUA Water Technologies LLC; Wallace & Tiernan Analyzers/Controllers Deox/2000 Measurement Module for So2 Dechlorination, 2014.

EVOQUA Water Technologies LLC; Wallace & Tiernan Instruction Manual Micro/2000 and Deox/2000 Measurement Module, 2014.

Muller, Christoph; Stadelmann, Eva, Kontinuierliche Messung von Chlor und Chlordioxid in der Getrankeindustrie, 1128, Brauwelt, Nr. 36/37 (2003).

Brode, Wallace R., The Dissociation of Potassium Iodide and the Absorption Spectra of Iodine and Potassium Iodide, Journal of the American Chemical Society, Jul. 1926, 48, Jg., Nr. 7, S. 1877-1882.

Delgado, Adrian; Briciu-Burghina, Ciprian; Regan, Fiona, Antifouling Strategies for Sensors Used in Water Monitoring; Review and Future Perspectives, Sensors, 2021, 21, Jg., Nr. 2, S. 389.

* cited by examiner

METHOD FOR OPTICAL ACTIVATION OF THE SENSOR SURFACE, IN PARTICULAR FOR ZERO CHLORINE SENSORS

CROSS-REFERENCE TO RELATED APPLICATION

This application claims the priority of German Application No. 10 2021 116 153.3, filed on Jun. 22, 2021, which incorporated herein by reference.

SUBJECT MATTER OF THE INVENTION

The invention relates to the use of a physical-technological radiation source in a method for cleaning and conditioning a sensor of an electrochemical measuring device for determining a constituent substance of a sample, wherein the measuring device comprises an electrolyte containing a chemical substance and the sensor, which comprises a measuring chamber in which a working electrode and reference electrode are disposed, between which an electrical signal can be detected in a measuring interval, from which the constituent substance can be inferred. The invention also relates to a sensor and a measuring device for carrying out the method according to the invention.

The result of electrochemical measuring methods for determining constituent substances in a sample is often strongly dependent on the active electrode surface of a sensor. Operation over time results in deposits and changes on the electrode, however, that reduce the active electrode surface and thus unintentionally impair the result of the measuring method. In particular if little or no analyte is present for extended periods of time, the work surface loses its measurement capable state. In practice, this leads to a great deal of cleaning and adjustment work and there is a risk of obtaining unreliable and incorrect measured values.

For this reason, cleaning of the electrode at regular intervals is necessary. A variety of different methods are known from the prior art for this purpose.

First of all, there is the possibility of mechanical cleaning, for example by abrasion with sand, corundum or similarly hard materials. However, this method is time-consuming and cost-intensive and, in measuring devices for dirty samples, usually leads to unreliable measured values. The apparatus also has to be disassembled, at least in order to change the abrasive material.

Another option is electrolytic degreasing. In this method, an alkaline cleaner is added to the electrolyte and the electrodes are alternately polarised. The gas development on the electrode surface intensifies the cleaning effect of the alkaline solution. However, this method has so far only been used to a very limited extent, because there is a risk that the polarisation capability of the electrodes during the measurement is negatively affected by the addition of the base.

Another option for cleaning is disclosed in the patent specifications CH 672845 A5 and EP 1 452 858 B1. They describe a method in which a voltage of alternating polarity is applied to the working electrode and the counter electrode in a cleaning section separate from the measuring operation, so that both reducing and oxidising gases are alternately formed at the working electrode and the counter electrode. This loosens contaminants on the electrodes and exposes the active electrode surfaces. However, due to the gases released during the cleaning process, this method cannot be used for membrane-covered sensors.

Also, in all of the aforementioned methods, the active electrode surface has to first be conditioned after the cleaning process, i.e., a measurement capable surface has to be created by establishing equilibrium, so that a virtually constant blank value and a consistent sensitivity of the measured parameter, which are necessary for reliable measurement, have been established. The conditioning behaviour is dependent on the concentration of the constituent substance to be determined in the sample. If the concentration of the constituent substance is very low, the conditioning phase can last several hours to days.

Another problem, that cannot be solved at all or only inadequately with the methods from the prior art, arises when the concentration of the constituent substance to be measured is below a characteristic threshold for the sensor type and there is consequently only a very low or at times no current flow at all between the working electrode and the corresponding reference electrode ("zero sensor"). Over time this can lead to a change in the active electrode surface. In this case, too, the working electrode has to be reconditioned until the active electrode surface has formed again and meaningful measured values can be obtained.

In membrane-covered amperometric sensors, the measuring chamber is partially delimited by a membrane which is selectively permeable for the constituent substance to be determined. This membrane is in direct contact with the sample to be measured. If the sensor is inactive for an extended period of time due to the absence of the constituent substance, deposits, in particular organic deposits such as biofilms, can form on the membrane surface or within the pores of the membrane. This leads to impaired diffusion of the analyte through the membrane to the working electrode and can then affect the sensitivity of the sensor and also the accuracy of measurement. As a cost-generating maintenance step, the membrane cap that includes the membrane has to be replaced regularly.

The commercially available W&T/Siemens Deox/2000® measuring device solves part of the aforementioned problems in that a conditioning agent is continuously fed into the measuring chamber from the outside and is then converted at the working electrode. This permanently keeps the electrode in a measurement capable state. The conditioning agent $I_2$ is prepared in a reaction tube upstream of the measuring chamber via the redox reaction of KI with chloramine T. The aqueous $I_2$ solution is then introduced into the measuring chamber by means of a peristaltic pump. To determine the concentration of a constituent substance of a sample, a defined quantity of sample is mixed with the $I_2$ solution before it is fed into the measuring chamber. The reaction of the iodine with the oxidising or reducing constituent substance of the sample increases or decreases the concentration of iodine. This also changes the measured value of the amperometric sensor, which make it possible to infer the concentration of the constituent substance to be determined. However, this method not only requires the integration of a reaction tube into the measuring device, but also necessitates keeping available appropriate quantities of reactive and sometimes unstable chemicals such as chloramine T. Over the course of the storage period, these can break down into unwanted by-products that contaminate the sensor. The conditioning agent can also only be changed in a cumbersome manner, namely by replacing the stored chemicals.

DE 10 2018 113 430 A1 solves the aforementioned problems by producing a conditioning agent at the working electrode and/or at a generator electrode disposed in the measuring device, wherein the conditioning agent is an oxidising or reducing agent that is oxidised at the working electrode when the conditioning agent is a reducing agent or is reduced when the conditioning agent is an oxidising agent. The electrochemical conversion of the conditioning agent cleans the working electrode and puts it into a measurement capable state with an active electrode surface, so that a virtually constant blank value and a consistent sensitivity of the measured parameter, which are necessary for reliable measurement, are established. If the working electrode is already in a measurement capable state, it is kept in this state by the electrochemical conversion of the conditioning agent.

However, the method has the disadvantage that either an additional generator electrode has to be integrated into the measuring device or, in the event that the conditioning agent is produced at the working electrode, the measurement has to be interrupted. Moreover, when the conditioning agent is produced at a separate generator electrode, the conditioning agent has to first diffuse onto the working electrode, which delays conditioning to a certain extent. The conditioning effect is therefore not always produced in a completely reliable and reproducible manner.

OBJECT

The object of the invention is therefore to provide a method for cleaning and conditioning an electrochemical sensor of a measuring device for determining a constituent substance of a sample that is easier to implement. This means that it requires no or only a shorter pause in the measurement and/or enables a simpler structural design. The method is also intended to be more reliable and reproducible than the methods known in the prior art.

According to the invention, this object is achieved by using a physical-technological radiation source for producing a conditioning agent to be reduced at the working electrode in a method for cleaning and conditioning an electrochemical sensor of a measuring device for determining a constituent substance of a sample, wherein the measuring device comprises:

a) an electrolyte containing a chemical substance,
b) the electrochemical sensor that comprises a measuring chamber, preferably sealed with a selectively permeable membrane, in which a working electrode and a reference electrode are disposed, between which an electrical signal can be detected in a measuring interval, from which the constituent substance can be inferred, wherein the method comprises the following steps:

producing a conditioning agent from the chemical substance by irradiating the electrolyte with the physical-technological radiation source, and reducing the conditioning agent at the working electrode.

The electrochemical conversion of the conditioning agent cleans the working electrode and puts it into a measurement capable state with an active electrode surface, so that a virtually constant blank value and a consistent sensitivity of the measured parameter are established. Both are necessary for reliable measurement. If the working electrode is already in a measurement capable state, it is kept in this state by the electrochemical conversion of the conditioning agent.

Without being tied to the theory, the inventors assume that the conditioning of the working electrode is accomplished via a removal of deposits and a depolarisation.

According to the invention, the conditioning agent is produced by irradiating the electrolyte in the measuring device, preferably in the measuring chamber. The conditioning agent produced from a chemical substance contained in the electrolyte reaches the working electrode disposed in the measuring chamber via diffusion and can be converted at said electrode by applying a voltage necessary for conversion. Thus, the conditioning effect is achieved. The conditioning agent can be produced during a measuring interval or in a separate conditioning interval. After conversion at the working electrode, the conditioning agent is preferably converted back to the chemical substance contained in the electrolyte.

The diffusion of the conditioning agent is preferably directed, i.e., the electrochemical sensor is designed such that the flow direction of the conditioning agent produced by irradiation has a radially inward directed component, i.e., toward the working electrode, so that the conditioning agent is diffused toward said electrode and reduced there. This can be achieved by a selectively permeable membrane, for example, which covers the measuring chamber, and the effective area of which, i.e., the permeable area, is smaller than or equal to the base surface of the working electrode facing the membrane. The effective area can be limited, for example, by partially masking the membrane.

The method according to the invention also makes it possible to free the other components of the electrochemical sensor, in particular the preferably present membrane and the other electrodes, of contaminants that impair the diffusion and the electrochemical reaction at the working electrode, or delay the deposition of contaminants. This can be attributed to the cleaning effect of the conditioning agent, which can disperse in the electrolyte by diffusion. The conditioning agent is preferably biocidal.

The "measuring device" is the spatially limited container that comprises at least one electrochemical sensor. It can also comprise one or more spatially limited modules for flow regulation, for measurement of the pH, for control, as well as one or more pumps. The electrochemical sensor can be connected to any other present modules via one or more connections, which can contain electrolyte. The constituent substances of the sample and/or the conditioning agent can be transported to the measuring chamber via pumps. At the same time or alternatively, the constituent substances and/or the conditioning agent can reach the measuring chamber by diffusion. They then diffuse through a preferably included membrane and are converted inside the measuring chamber at the working electrode.

The "electrochemical sensor" comprises a measuring chamber, which contains electrolyte and in which the working electrode and a reference electrode which is electrically connected to the working electrode are disposed. In the context of the invention, a "working electrode" is the electrode that is used to determine the measured value of the electrochemical sensor. The constituent substance to be determined of the sample is electrochemically reduced at this electrode and an analysis value is obtained from these processes. The electrochemical sensor is preferably an amperometric sensor. During the measuring procedure, a voltage is applied between the working electrode and the reference electrode which is electrically connected to it and regulated by means of a suitable arrangement, such as a potentiostat. With such an amperometric sensor, the constituent substance is determined during a measuring interval by measuring the current flowing across the electrical connection between the working electrode and the reference electrode and inferring the constituent substance from the measured current.

In one embodiment, the electrochemical sensor further comprises a counter electrode at which a redox reaction takes place for charge balancing. A corresponding embodiment of the working electrode system is referred to as a three electrode arrangement. In a preferred embodiment, the reference electrode can at the same time also be the counter electrode. This design is referred to as a two electrode arrangement.

In the context of the present invention, the term "electrolyte" includes ion-conducting media, in particular ion-conducting liquids, such as saline solutions or saline gels. Aqueous electrolytes, i.e., electrolytes having a water content of at least 70 wt %, are particularly preferred.

The "chemical substance" contained in said electrolyte is a pure substance, i.e., an element or a compound, in particular a salt, or a mixture of the aforementioned. The conditioning agent is produced from this by means of irradiation, possibly with the participation of other chemical substances contained in the electrolyte; i.e., a light-induced conversion takes place, from which the conditioning agent is produced. In principle, all photoinduced reactions, in which a substance that can be reduced in the electrochemical sensor, i.e., the conditioning agent, can be produced from a chemical substance contained in the electrolyte, are suitable for this purpose. The advantage of the method according to the invention is that irradiation can be used to specifically control where and when the conditioning agent is released. The conditioning effect can thus be controlled in a much more simple and flexible manner than in the methods known from the prior art.

The "sample", the constituent substance of which is to be determined, is a liquid, preferably an ion-conducting liquid, such as water.

The "physical-technological radiation source" preferably produces electromagnetic radiation in the UV-Vis range, preferably in the range from 200 to 1000 nm, more preferably in the range from 300 to 800 nm, even more preferably in the range from 300 to 600 nm, and most preferably in the range from 300 to 450 nm. The physical-technological radiation source is preferably a light-emitting diode, i.e., a light-emitting semiconductor component. Light-emitting diodes emit radiation in a limited spectral range; they are almost monochromatic. The "physical-technological radiation source" particularly preferably produces radiation in a wavelength range that is necessary for the photoinduction of the reaction; i.e., a range in which the chemical substance and/or any further reactants in the electrolyte have their absorption maxima. Light-emitting diodes are particularly suitable for this purpose because of their limited spectral range.

The LED is preferably an LED with UVA, UVB, UVC and white light (white light=spectral range 400 to 800 nm), a blue LED (spectral range 400 to 500 nm) or a green LED (spectral range 490 to 570 nm).

The physical-technological radiation source is preferably disposed in an electrode body, i.e., for example in a blind hole of an electrode body. An electrode body is an enclosure device, which comprises the electrodes and electrode-protecting elements and can be made of a plastic such as polymethyl methacrylate, for example, and which is immersed in the electrolyte during operation. The radiation reaches the electrolyte through a radiation-permeable region of the electrode body.

In another preferred embodiment of the invention, the physical-technological radiation source is disposed outside the electrochemical sensor, but is arranged in such a way that a majority of the radiation, i.e., >30% of the radiation power, reaches the part of the electrolyte disposed in the sensor. Preferably >50% of the radiation reaches the electrolytes, particularly preferably >70%, and most preferably >80%.

The radiation source can preferably be controlled by means of an electronic assembly.

In one embodiment, the working electrode is made of a noble metal, preferably platinum or gold, particularly preferably platinum. In another embodiment, the working electrode is made of glassy carbon or other electrode materials known in the literature.

The "conditioning agent" that is produced in the measuring device and reduced at the working electrode of the electrochemical sensor is an oxidising agent. In this context, oxidising agent means that the redox pair consisting of the oxidising agent and the corresponding reducing agent has a redox potential, so that the oxidising agent is reduced to the corresponding reducing agent by the voltage applied to the working electrode. In other words, the voltage between the working electrode and the electrically connected reference electrode is less than the standard redox potential of the redox pair consisting of the oxidising agent and the corresponding reducing agent.

In a preferred embodiment, the chemical substance contained in the electrolyte is a salt or the corresponding acid of a halide or a polyhalide, preferably $I^-$ or $I_3^-$. The salt or acid can be HI or KI, for example.

The conditioning agent $I_2$ can be produced from $I^-$ or $I_3^-$ by irradiation in the presence of oxygen in the electrolyte.

$$4\,I^- + O_2 + 2\,H^+ \xrightarrow{+\,hv} 2\,OH^- + 2\,I_2$$

The produced conditioning agent iodine then diffuses to the working electrode and can be converted there so that the conditioning effect occurs.

An analogous reaction can also be observed with other salts and acids of halide ions, such as bromides.

If the conditioning agent is $I_2$, the working electrode has to be polarised <540 mV with respect to the reference electrode under standard conditions, because the standard redox potential of the redox pair is $I_2/2I^-$ 540 mV. If the voltage is below this limit value, iodine is reduced to iodide:

$$I_2+2e^-\rightarrow 2I^-$$

If working under non-standard conditions, the voltage to be used has to be adjusted accordingly, as is known to the person skilled in the art. The well-known overvoltages for different electrode materials, among other things, have to be taken into account. The described inventive conditioning effect occurs as a result of the conversion of $I_2$, i.e., the formation of $I^-$. The produced iodide can then subsequently react with any $I_2$ present in the electrolyte to form $I_3$.

The conditioning agent can also be produced by producing an oxidising agent in the electrolyte by means of irradiation, which can oxidise a reducing agent contained in the electrolyte into the conditioning agent.

If the conditioning agent is to be $I_2$, for example, it too can be produced in the measuring device in that the electrolyte contains iodide ions and an oxidising agent such as $Br_2$ is produced in the measuring device by irradiation, which can oxidise the iodide to $I_2$.

The conditioning agent is preferably an oxidising agent selected from bromine, chlorine, iodine, most preferably iodine.

In a further preferred embodiment of the invention, the conditioning agent is produced by irradiation in a separate cleaning and/or conditioning process. It is advantageous that the conditioning behaviour of the electrodes is dependent on the concentration of the conditioning agent. The conditioning phase can be shortened by producing a correspondingly high concentration of conditioning agent.

In another embodiment of the invention, the conditioning agent is produced by irradiation during the measuring interval. In this case, the reference value which is produced at the working electrode by the supplied or produced conditioning agent has to be subtracted from the measured value of the electrochemical sensor.

This makes it possible to ensure continuous measuring operation; i.e., the electrode surface of the working electrode remains active and no cleaning and/or conditioning phases are necessary.

In a further embodiment the conditioning agent is produced discontinuously, preferably in a pulsed manner, wherein the time interval in which the conditioning agent is produced is very much shorter than the temporal interval in which no conditioning agent is produced. If the conditioning agent is produced by irradiation during the measuring operation, the reference value which is produced by the conditioning agent at the working electrode has to be subtracted from the measured value of the sensor. The measurement can alternatively also be paused for the short time interval in which the conditioning agent is produced.

In one embodiment of the invention, the conditioning agent is produced continuously. If the continuous production by irradiation takes place during the measuring interval, a defined, virtually constant reference value is obtained by the conditioning agent at the working electrode, which has to be subtracted from the measured value of the working electrode. A consistent cleaning and conditioning effect is then achieved as a result of the continuous production of the conditioning agent. This prevents contaminants from being able to build up on the surface of the working electrode and changing the structure of the electrode surface of the working electrode such that it becomes inactive. The total quantity of conditioning agent produced by irradiation can consequently be kept low.

In a preferred embodiment, the irradiation is time-controlled and preferably takes place with fixed time intervals between successive irradiation periods. The successive irradiation periods particularly preferably have the same length.

In a further preferred embodiment, a predetermined quantity of conditioning agent is produced in the measuring device.

In a preferred embodiment of the invention, 50% or more, preferably 60% or more, more preferably 65% or more, and most preferably 70% or more of the integral of the radiation spectrum of the physical-technological radiation source is in a wavelength range of <550 nm, preferably <500 nm. This is advantageous because the reactions to produce the conditioning agent, for example the radiation-induced oxidation of a chemical substance, are generally induced by irradiation in a wavelength range of <550 nm. If the majority of the radiation spectrum is within this range, the rate of conversion of the chemical substance to the conditioning agent is increased accordingly.

The physical-technological radiation source is preferably disposed inside the measuring device, particularly preferably inside the measuring chamber.

In one embodiment of the invention the produced conditioning agent is the constituent substance of the sample determined by the amperometric sensor. This can advantageously be used to determine the constituent substance of a sample, the concentration of which is below the detection limit of a sensor where no conditioning agent is fed into or produced in the measuring chamber:

The measured value at the detection limit has an increased inaccuracy, which does not exceed a predetermined statistical confidence interval, however. Measured values that have a greater inaccuracy than the predetermined interval are below the detection limit and, in terms of measuring technology, are described as being unmeasurable or undetectable.

The criterion of "reliable detection" is usually related to the precision of the measuring method in an empty measurement that yields the blank value. This means the statistical error or the fluctuation of the measuring signal if no sample is present (e.g., the standard deviation from the blank value).

In the context of the invention, a measurement is deemed to be proof if the measured value is at least three standard deviations above the blank value.

In order to determine the constituent substance of a sample the concentration of which is below the detection limit of a measuring device in which no conditioning agent is produced in the measuring device, the constituent substance to be determined is produced at the working electrode during or before measurement. During the conversion at the working electrode, a measured value is obtained, which is the sum of the reference value produced by the conditioning agent at the working electrode and the value produced by the constituent substance of the sample at the working electrode. The obtained measured value can thus be raised to a value above the detection limit. The constituent substance in the electrolyte can be determined by subtracting the reference value from the measured value. The rate of production of the conditioning agent is preferably constant.

In a further embodiment of the invention, the conditioning agent produced by irradiation is not the constituent substance determined by the electrochemical sensor. In a further embodiment, it is also possible to produce a plurality of different conditioning agents by irradiation. The conditioning agent can also be changed by adding a chemical substance not already contained in the electrolyte to said electrolyte and setting the irradiation such that said substance is converted to the conditioning agent.

In one embodiment, a detection electrolyte is used as the electrolyte. A detection electrolyte comprises a component that is converted to a detection component by the constituent substance to be determined of the sample, for example by oxidation. The detection component is reduced at the working electrode and the change in the measured variable is used to infer the constituent substance to be determined. If an iodide salt solution is used as the detection electrolyte of a measuring device for determining $Cl_2$ in a sample, for example, the constituent substance to be determined of the sample, $Cl_2$, oxidises the $I^-$ contained in the detection electrolyte into the detection component $I_2$.

$$Cl_2+2e^-\rightarrow 2Cl^- \quad \text{reduction}$$

$$2I^-\rightarrow I_2+2e^- \quad \text{oxidation}$$

$$Cl_2+2I^-\rightarrow 2Cl^-+I_2 \quad \text{total}$$

The detection component $I_2$ can then be reduced at the working electrode and the constituent substance $Cl_2$ can be inferred from the obtained measured value.

In a preferred embodiment, the detection component is used as the conditioning agent.

In a preferred embodiment, the constituent substance to be determined of the sample is an oxidising agent, for example oxidative halogen compounds such as those of chlorine, bromine and iodine, chloramines and bromamines, $Cl_2$, $Br_2$, $O_3$, $ClO_2$, peracetic acid, $H_2O_2$, a chlorite or hypochlorite salt or the corresponding acid, preferably hypochlorous acid (HOCl).

In a preferred embodiment, the electrolyte is an iodide salt solution and the conditioning agent is $I_2$.

In a preferred embodiment, the method according to the invention is used to monitor the functionality of the sensor. For this purpose, a defined quantity of the constituent substance to be determined is produced by irradiation and the measured variable obtained from the electrochemical sensor is compared with a previously known value. This makes it possible to detect any faults, such as a sensor defect, cable breaks or errors in the evaluation system.

In a preferred embodiment, an adjustment value is subtracted from the value measured during the measuring interval, wherein, during an adjustment interval in which no constituent substance to be determined of a sample is present in the electrolyte, the adjustment value is determined by producing a quantity of the constituent substance to be determined by irradiation and determining the measured variable obtained from the electrochemical sensor.

In a further preferred embodiment, the conditioning agent is produced inside the measuring chamber by irradiation.

The invention also includes an electrochemical sensor for carrying out the method defined in Claims 1 to 11, i.e., a method for cleaning and conditioning an electrochemical sensor of a measuring device for determining a constituent substance of a sample, wherein the measuring device comprises:

a) an electrolyte containing a chemical substance, b) the electrochemical sensor that comprises a measuring chamber sealed with a selectively permeable membrane, in which a working electrode and a reference electrode are disposed, between which an electrical signal can be detected in a measuring interval, from which the constituent substance can be inferred, wherein the method comprises the following steps:

producing the conditioning agent from the chemical substance by irradiating the electrolyte with the physical-technological radiation source, reducing the conditioning agent at the working electrode when the conditioning agent is an oxidising agent and wherein a physical-technological radiation source is used in said method to produce a conditioning agent.

The electrochemical sensor comprises a measuring chamber in which a working electrode and a reference electrode are disposed, between which an electrical signal can be detected in a measuring interval, from which the constituent substance can be inferred, and a physical-technological radiation source disposed inside the measuring chamber, wherein said source is preferably disposed in an electrode body.

The electrochemical sensor preferably comprises a selectively permeable membrane that delimits the measuring chamber.

The conditioning agent produced by irradiation or the corresponding reducing agent can pass through the pores or through the material of the membrane. The accumulation of substances, in particular organic substances such as biofilms, to the surface or within the pores of the membrane can be delayed or reduced by oxidation or reduction of the substances. The service life of the membrane can thus be extended significantly.

In the method according to the invention, the direction of diffusion of the conditioning agent results from its concentration gradient. The concentration of the conditioning agent is high in the region of the electrolyte on which the radiation impinges, because it is produced there from the corresponding reducing agent. At the working electrode, on the other hand, the conditioning agent is converted, so that the concentration there is normally lower. When the radiation source irradiates electrolyte inside the measuring chamber and thereby produces a conditioning agent, the concentration outside the measuring chamber is typically the lowest. The produced conditioning agent therefore largely flows out of the measuring chamber and can therefore only have a limited conditioning effect. For this reason, in order to maximise the cleaning and conditioning effect of the conditioning agent, it is advantageous to dispose the working electrode in the direction of diffusion of the conditioning agent when the radiation source irradiates electrolyte inside the measuring chamber. If the working electrode is now disposed in this direction, the conditioning agent is reduced there, before exiting the measuring chamber, into the corresponding reducing agent, which then flows back to the irradiation location. This creates a closed circuit, as a result of which virtually none of the aforementioned agents can diffuse out of the measuring chamber which is preferably sealed with a membrane. The working electrode is preferably disposed such that, over a period of irradiation of at least 1 hr, at most 5 wt %, preferably at most 1 wt % of the aforementioned agents, diffuse out of the measuring chamber.

In order to achieve such an arrangement, in one embodiment the measuring chamber can be covered by a selectively permeable membrane and 20% of the surface of the working electrode, preferably 30%, even more preferably 50%, can have a smaller distance to the selectively permeable membrane than a radiation source disposed inside the measuring chamber. This ensures that the conditioning agent produced near the radiation source is reduced at the working electrode and diffuses outward through the membrane only to a small extent.

The invention also includes a measuring device for carrying out the above-defined method, wherein the device comprises at least one electrochemical sensor and a physical-technological radiation source preferably disposed outside the measuring chamber. The device preferably also comprises a control device.

In a preferred embodiment of the invention, the measuring chamber is covered by a preferably selectively permeable membrane. Selectively permeable means that only certain chemical substances can pass through the membrane. If the radiation source is disposed inside the measuring chamber, the selectively permeable membrane is preferably non-transparent to the radiation of the radiation source. This increases the yield of the conversion reaction from chemical substance to conditioning agent. If the radiation source is disposed outside the measuring chamber, on the other hand, the membrane is transparent to the radiation of the radiation source. The effective area of the selectively permeable membrane, i.e., the permeable area, is then particularly preferably less than or equal to the base surface of the working electrode facing the membrane. This achieves "directed diffusion", i.e., the flow direction of the conditioning agent produced by irradiation has a radially inward directed component, i.e., toward the working electrode, as a result of which the conditioning agent diffuses toward said electrode and is reduced there. The effective area of a membrane can, for example, be reduced by using a mask, i.e., partially covering a permeable membrane with an impermeable material.

In a preferred embodiment, the measuring chamber is covered with a selectively permeable membrane and the working electrode is cylindrical, whereby the one base surface of the cylinder is oriented toward the membrane. The selectively permeable portion of the membrane is smaller than the base surface of the cylinder of the working electrode and is disposed such that its projection onto the base surface of the working electrode is at least 70%, preferably at least 80%, even more preferably at least 90% on the base surface of the working electrode. The selectively permeable portion of the membrane is preferably arranged concentrically to the base surface of the cylinder of the working electrode.

The attached figures represent specific embodiments of the invention. The figures show:

FIG. 1: Schematic illustration of a specific embodiment of a measuring chamber according to the invention comprising a selectively permeable membrane and a physical-technological radiation source disposed inside said measuring chamber.

Figure 2:
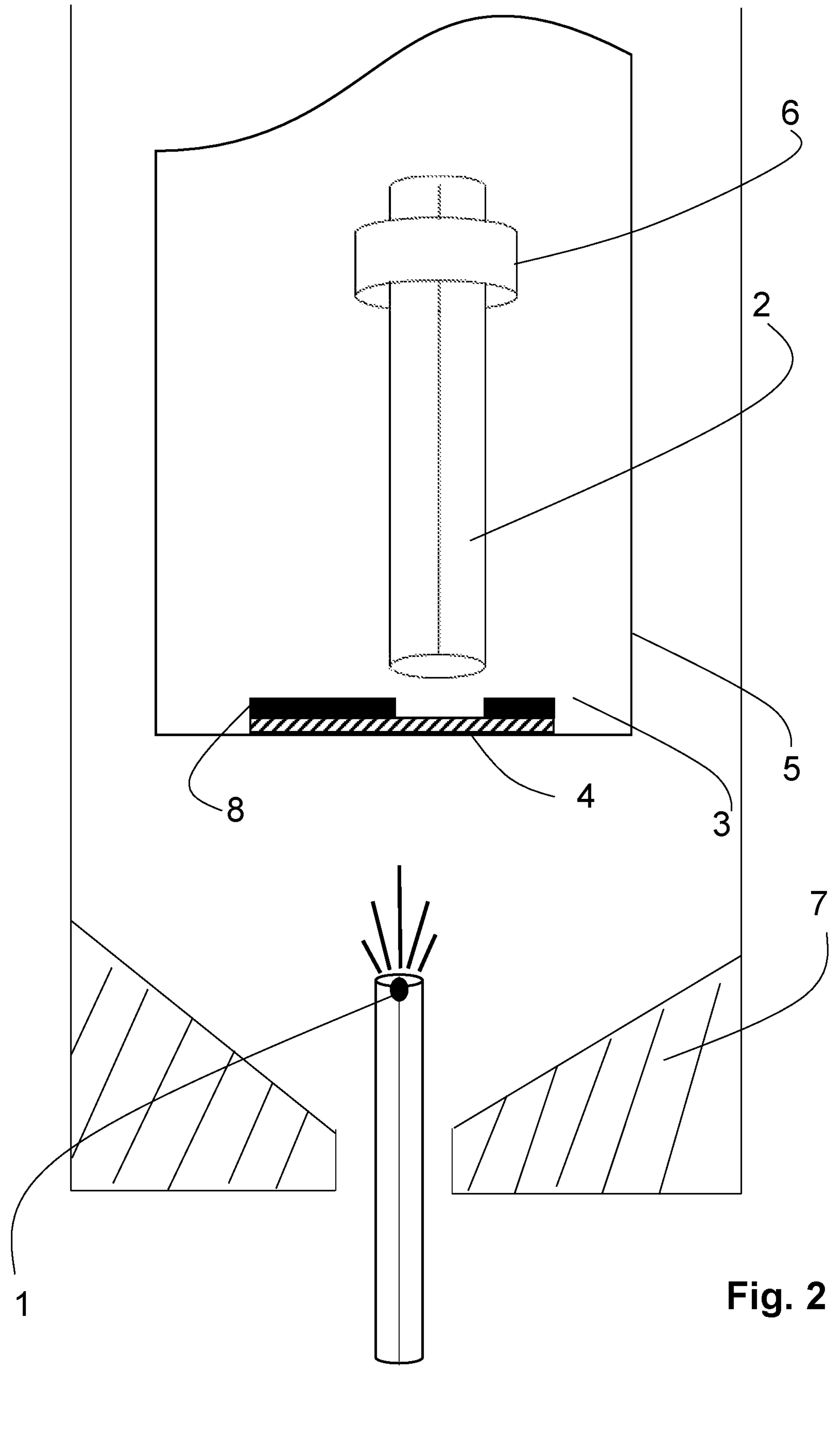

FIG. 2: Schematic illustration of a specific embodiment of a measuring chamber according to the invention comprising a selectively permeable membrane and a physical-technological radiation source disposed outside said measuring chamber.

FIG. 1 shows a schematic illustration of a measuring chamber 5 of an electrochemical sensor according to the invention, which comprises a selectively permeable membrane 4 and an electrode body. This electrode body comprises a working electrode 2, an associated reference electrode 6 and a physical-technological radiation source 1. The cylindrical working electrode 2 is disposed inside the hollow cylindrical reference electrode 6. They are connected to one another via a measuring device (not shown), so that an electrical signal can be detected during a measuring interval, from which the presence of a constituent substance in the sample can be inferred. The physical-technological radiation source is an LED 1 that emits white or UV light and is disposed in a blind hole of the electrode body. The electrode body is connected to the electronics in the upper part (not shown) and, together with the two electrodes and the LED, is immersed into the membrane cap filled with electrolyte and is tightly screwed to it. These components together form the measuring chamber 5. The physical-technological radiation source irradiates a portion of the electrolyte 3 disposed inside the measuring chamber 5, so that the conditioning agent is produced from the chemical substance contained in the electrolyte. This conditioning agent then diffuses to the working electrode 2 and is reduced there, so that the conditioning effect occurs there. The selectively permeable portion of the membrane 4, which is not covered by the mask 8, is smaller than the base surface of the cylinder of the working electrode 2 and is disposed such that its projection onto the base surface of the working electrode 2 is at least 90% on the base surface of the working electrode.

FIG. 2 shows a schematic illustration of a measuring chamber 5 of an electrochemical sensor according to the invention comprising a selectively permeable membrane 4, a working electrode 2, and the associated reference electrode 6. The cylindrical working electrode 2 is disposed inside the hollow cylindrical reference electrode 6. They are connected to one another via a measuring device, so that an electrical signal can be detected during a measuring interval, from which the presence of a constituent substance in the sample can be inferred (not shown). The physical-technological radiation source is an LED 1 that emits white or UV light and is disposed outside the measuring chamber 5, e.g., in an inflow plug 7 of the measuring device. The radiation cone is oriented toward the measuring chamber 5, so that the radiation passes through the at least partially radiation-permeable membrane 4 and the conditioning agent is produced by a photoinduced reaction. This conditioning agent then diffuses to the working electrode 2 and is reduced so that the conditioning effect occurs. The selectively permeable portion of the membrane 4, which is not covered by the mask 8, is smaller than the base surface of the cylinder of the working electrode 2 and is disposed such that its projection onto the base surface of the working electrode 2 is at least 90% on the base surface of the working electrode 2.

REFERENCE SIGNS

1 LED (UV or white light) in a blind hole
2 Working Electrode
3 Electrolyte
4 Membrane
5 Measuring chamber
6 Reference Electrode
7 Inflow plug
8 Mask

The invention claimed is:

1. A method for cleaning and conditioning an electrochemical sensor of a measuring device for determining a constituent substance of a sample, wherein the measuring device comprises:

a) an electrolyte containing a chemical substance, b) the electrochemical sensor that comprises a measuring chamber (5) in which a working electrode (2) and a reference electrode (6) are disposed, between which an electrical signal can be detected in a measuring interval, from which the constituent substance can be inferred, and c) a physical-technological radiation source, wherein the method comprises the following steps:

producing a conditioning agent from the chemical substance by irradiating the electrolyte with the physical-technological radiation source, and reducing the conditioning agent at the working electrode (2).

2. The method according to claim 1 wherein the chemical substance is a salt or corresponding acid of a halide.

3. The method according to claim 1 wherein the conditioning agent is not produced during the measuring interval.

4. The method according to claim 1 wherein the conditioning agent is produced in a pulsed manner.

5. The method according to claim 1 wherein the irradiation is time-controlled.

6. The method according to claim 5 wherein the irradiation is time-controlled with fixed time intervals between successive irradiation periods.

7. The method according to claim 1 wherein 50% or more of the integral of the radiation spectrum of the physical-technological radiation source is in a wavelength range of <550 nm.

8. The method according to claim 7 wherein 50% or more of the integral of the radiation spectrum of the physical-technological radiation source is in a wavelength range of <500 nm.

9. The method according to claim 1 wherein the constituent substance to be determined is used as the conditioning agent.

10. The method according to claim 1 wherein a detection electrolyte which comprises a component that is reduced or oxidised into a detection component by means of the constituent substance to be determined is used as the electrolyte.

11. The method according to claim 1 wherein the constituent substance to be determined is an oxidising agent, selected from the group consisting of oxidative halogen compounds of chlorine, bromine and iodine, chloramines and bromaines, $Cl_2$, $Br_2$, $O_3$, $ClO_2$, peracetic acid, $H_2O_2$, a chlorite salt, hypochlorite salt and the corresponding acid.

12. The method according to claim 1 further comprising subtracting an adjustment value from the electrical signal measured during the measuring interval, and determining the adjustment value by measuring the electrical signal during an adjustment interval in which the constituent substance to be determined is not present.

13. The method according to claim 1 wherein the conditioning agent corresponds to the constituent substance to be determined of the sample and a quantity of the conditioning agent is produced by irradiation in the measuring chamber (5) or a quantity of the conditioning agent is produced by irradiation in a section of the measuring device and delivered to the measuring chamber (5) and the electrical signal is detected between the working electrode (2) and the reference electrode (6).

14. The method according to claim 1 wherein the chemical substance is selected from the group consisting of HI and KI.

15. An electrochemical measuring device comprising:

a) an electrochemical sensor comprising a measuring chamber (5) in which a working electrode (2) and a reference electrode (6) are disposed, between which an electrical signal can be detected in a measuring interval, from which a constituent substance can be inferred, and b) a physical-technological radiation source, wherein the physical-technological radiation source is configured to produce a conditioning agent from a chemical substance of an electrolyte disposed in the measuring chamber by irradiating the electrolyte with the physical-technological radiation source.

16. The electrochemical measuring device according to claim 15, wherein the physical-technological radiation source is disposed inside the measuring chamber (5).

17. An electrochemical measuring device comprising:

a) an electrochemical sensor comprising a measuring chamber (5) in which a working electrode (2) and a reference electrode (6) are disposed, between which an electrical signal can be detected in a measuring interval, from which a constituent substance can be inferred, and b) a physical-technological radiation source;

wherein the measuring chamber (5) is sealed with a selectively permeable membrane (4).

18. An electrochemical measuring device comprising:

a) an electrochemical sensor comprising a measuring chamber (5) in which a working electrode (2) and a reference electrode (6) are disposed, between which an electrical signal can be detected in a measuring interval, from which a constituent substance can be inferred, and b) a physical-technological radiation source;

wherein the physical-technological radiation source is disposed inside the measuring chamber (5);

wherein said physical-technological radiation source is disposed in an electrode body which comprises the working electrode (2) and the reference electrode (6).

* * * * *